Aug. 30, 1938.                W. PIERPOINT                2,128,888
                               BATTERY CLASP
                    Original Filed March 8, 1932    2 Sheets-Sheet 1

W. T. Pierpoint, Inventor

By Horace C. Chandler
                    Attorney

Aug. 30, 1938.  W. PIERPOINT  2,128,888
BATTERY CLASP
Original Filed March 8, 1932    2 Sheets-Sheet 2
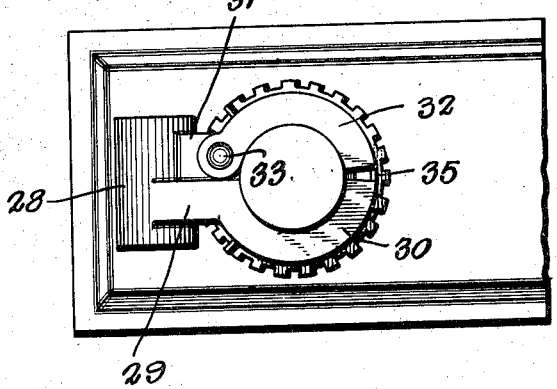
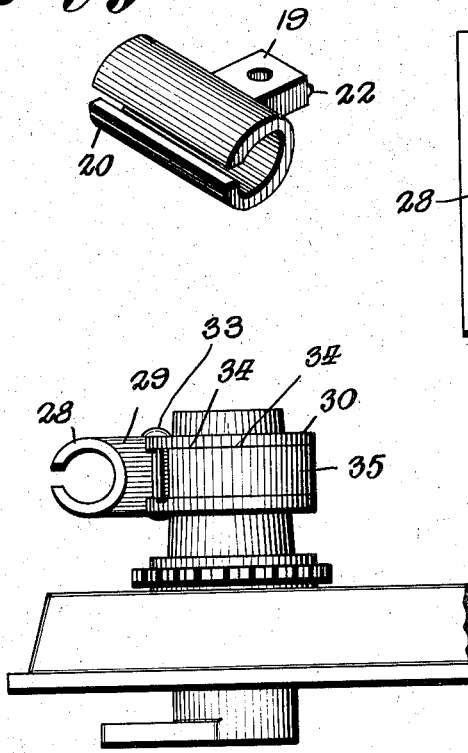
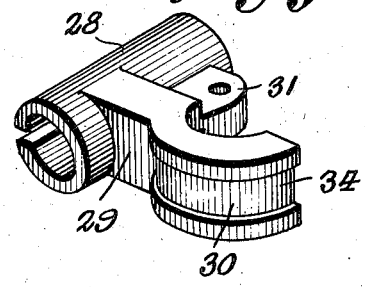
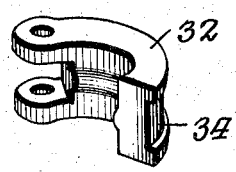
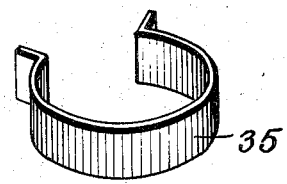
W. T. Pierpoint, Inventor
By Horace C. Chandler
Attorney Patented Aug. 30, 1938

2,128,888

UNITED STATES PATENT OFFICE 2,128,888

BATTERY CLASP

William Pierpoint, deceased, late of Yonkers, N. Y., by William C. Pierpoint, administrator, Kingston, N. Y., assignor to Pierpoint-Urzaiz Co., Inc.

Refiled for abandoned application Serial No. 597,596, March 8, 1932. This application October 22, 1936, Serial No. 107,085

8 Claims. (Cl. 173—259)

This invention relates to new and useful improvements in batteries and wire connections therefor.

One object of the invention is to provide a novel and improved terminal post for a battery of the storage type which is simple in construction, and with which a wire terminal may be easily and quickly engaged or disengaged.

Another object is to provide a novel and improved construction of terminal for a conductor which can be easily operated for attachment to or disengagement from the post of a battery, and which, when properly engaged with said post, will be incapable of accidental displacement therefrom, or become loose thereon.

Other objects and advantages will be apparent from the following description when taken in connection with the accompanying drawings.

In the drawings:

Figure 7 is a perspective view of the wire holding member, the clamping jaws being removed to show the extension.

Figure 8 is a top plan view of a modified form of the invention.

Figure 9 is a side elevation of the same.

Figure 10 is a perspective view of the wire holding member, showing one of the post gripping jaws integral therewith, and the eye for connection to the other jaw.

Figure 11 is a perspective view of the movable jaw.

Figure 12 is a perspective view of the clamping spring.

Figure 1:
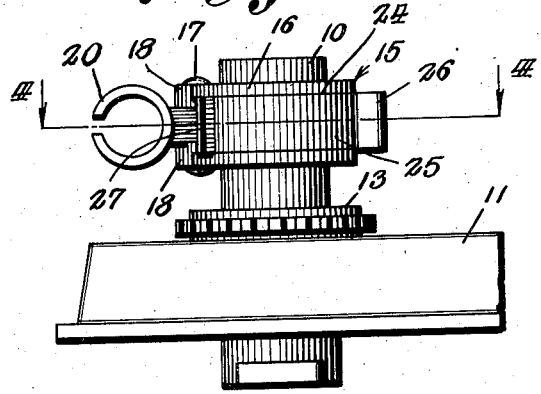
Figure 1 is a side elevation of the invention.
Figure 3:
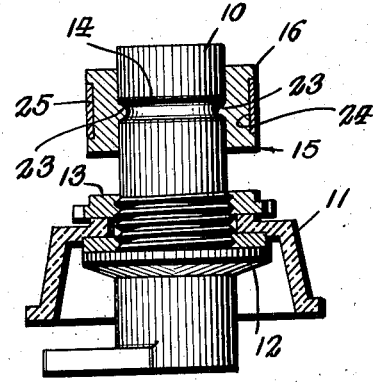
Figure 3 is a vertical transverse sectional view on the line 3—3 of Figure 2.

Referring particularly to the accompanying drawings, 10 represents a terminal post of the battery 11, which is held in the battery casing by means of the flange 12, and the nut 13, bearing respectively against the lower and upper faces of the top of said battery. Formed in the peripheral face of the upper end portion of the post 10, is groove 14, the purpose of which will be presently explained herein.

Figure 2:
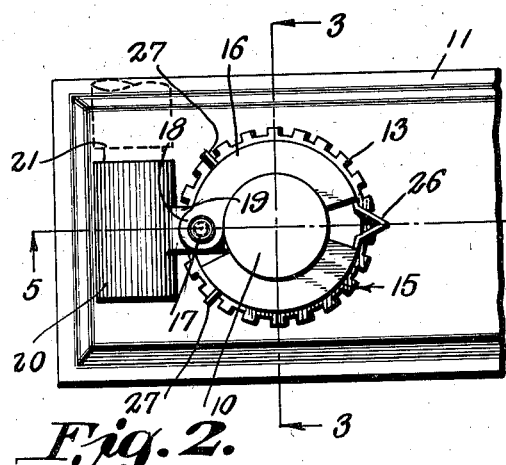
Figure 2 is a top plan view of the same.
Figure 4:
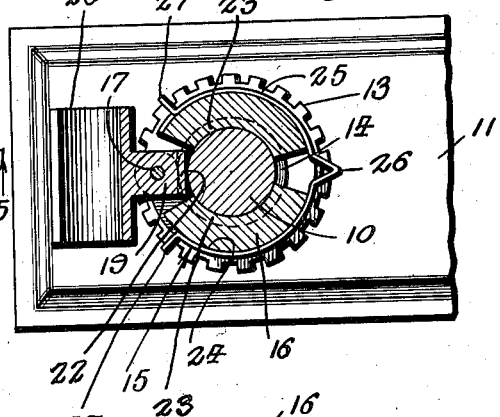
Figure 4 is a horizontal sectional view on the line 4—4 of Figure 1.
Figure 5:
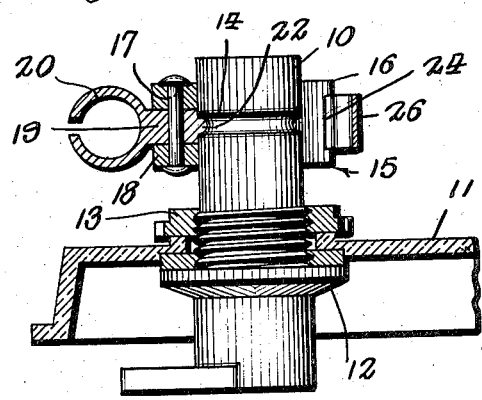
Figure 5 is a vertical sectional view on the line 5—5 of Figure 2.
Figure 6:
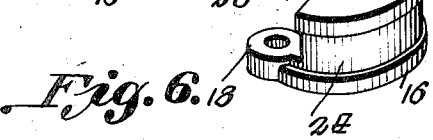
Figure 6 shows perspective views of the post embracing members.

Engaged on the post 10 is the conductor terminal, represented as a whole by the numeral 15. This terminal includes the pair of arcuate members 16, pivoted together at one end by means of the pin 17, and having the ears 18 so spaced as to permit the interposition of the apertured lug 19, of the tubular member 20, within which the end of the conductor 20 is secured. This lug 19 also receives the pivot pin 17 therethrough, and has the projection 22, which engages in the groove 14 of the post 10, the groove entering portion of said projection forming a continuation of the ribs of the arcuate members 16. In the concave face of each of the arcuate members 16 there is formed a longitudinally extending rib 23, which, when the device is disposed in proper embracing relation to the post, enters the beforementioned groove 14. As clearly seen in the top plan view, Figure 2, the other ends of the arcuate members do not contact, when arranged in embracing relation to the post. In the outer or convex face of each of the arcuate members 16 is a longitudinal groove 24. A split spring band 25 is engaged in the grooves 24, of the arcuate members 16, to hold the latter in embracing engagement with the post, said spring band having an intermediate V-shaped kink 26, and having its ends turned downwardly, as shown at 27 forming finger means to facilitate the removal thereof.

In the operation of the device, the members 16 are swung apart sufficiently to permit said members being engaged in embracing relation to the battery post 10, with the ribs 23 properly seated in the groove 14. The spring band is then slipped or sprung on the members 16, by engaging the outturned ends with said members at opposite sides of the spaces between the ends thereof, and pressing the band inwardly until it embraces the members and lies within the grooves 24. The spring band is of sufficient strength to tightly hold the arcuate members of the clamp in engagement with the post.

Due to the weight of the cable end, which is secured within the tubular member 20, said cable end would sag, resulting in a downward pulling action on the pivoted portions of the arcuate members 16, and the tendency of the same to become partly sprung out of their groove engagement with the post, thereby producing a looseness between these members and the post, and the incomplete transmission of current from the battery to the cable. The presence of the projection 22, which is engaged in the said groove, of the post, will prevent this sagging, whereby the parts will maintain their firm electrical contact with the post. Furthermore, in view of the fact that the arcuate members 16 are pivotally connected with the projection 19, and such connection is, of necessity, comparatively loose, the transmission of current, from the battery post to the wire cable, through the tubular member 20, would be somewhat impaired. Therefore, by reason of the fact that the projection 19 engages directly with the post, and is an integral part of the tubular member, the current will be readily and effectively transmitted to the cable.

In Figure 8 there is shown a modified form of the cable terminal, which includes the tubular portion 28, in the bore of which is adapted to be secured an end of a wire cable, and formed on and extending from one side of said member 28 is a lug 29, the outer end of which is provided with the curved portion 30, corresponding to an arcuate member 16, of the first form, but in this instance being stationary instead of movable.

The inner portion of the lug 29, adjacent the member 28, is reduced in thickness, as shown at 31, over which is straddled the bifurcated end of the movable jaw 32, a pivot pin 33 being engaged through said jaw and said lug. The exteriors of the stationary jaw 30, and the movable jaw 32 are grooved, as at 34, to receive the spring band 35, which, like the spring band 25, has its ends turned out to provide finger means to facilitate the removal thereof.

This application is a refiling of that filed March 8, 1932, Serial No. 597,596.

What is claimed is:

1. A battery connector including a peripherally grooved post, and a conductor terminal having a lateral extension engaged in said groove of the post, and post embracing members movably supported on said extension, and a spring band embracing said post embracing members, said band having outturned ends forming finger means to facilitate the removal of said band.

2. A battery connector including a peripherally grooved post, and a conductor terminal having a lateral extension engaged in the groove of the post, and post embracing members pivotally carried by said extension, and means for holding the embracing means engaged with the post.

3. A battery connector including a peripherally grooved post, and a conductor terminal having a lateral extension engaged in said groove, post embracing members pivotally mounted on the extension and having ribs received in said groove, and resilient means for embracing the members to maintain the latter engaged with the post.

4. A battery connector including a peripherally grooved post, and a conductor terminal including a conductor end receiving means, post embracing members pivoted on said conductor receiving means having ribs engaged in the groove of the post, and a spring band removably engaged with the exteriors of said members for holding said members clamped on said post.

5. A battery connector including a peripherally grooved post, and a conductor terminal including a pair of pivotally connected post embracing arcuate members having interior ribs engaged in the groove of the post and having exterior grooves, a conductor supporting means carried by the pivot means and engaged in the groove of the post, and a spring band removably engaged in the exterior grooves of the members.

6. A battery connector including a conductor end supporting means, a lug formed on said supporting means, arcuate battery post embracing members connected to said lug, spaced circumscribing flanges on the outer face of each of said embracing members, and a flat spring band positioned between said flanges and embracing said embracing members, said spring band having outturned ends forming finger means to facilitate the removal thereof.

7. A battery connector including conductor end supporting means, battery post embracing members projecting laterally from said supporting means, one end of each of said members being pivoted to said supporting means, and a spring band embracing said post embracing members.

8. A battery connector including a conductor end supporting means, a lug formed on said supporting means, arcuate battery post embracing members pivoted to said lug, spaced circumscribing flanges on the outer face of each of said embracing members, and a flat spring band positioned between said flanges and embracing said embracing members, said spring band having outturned ends forming finger means to facilitate the removal thereof.

WILLIAM C. PIERPOINT,
*Administrator of the Estate of William Pierpoint, Deceased.*